(12) United States Patent
Wilson

(10) Patent No.: US 6,192,746 B1
(45) Date of Patent: Feb. 27, 2001

(54) APPARATUS AND METHOD OF PROVIDING ELECTRICAL POWER TO AN ACTIVE ELECTRONIC DEVICE EMBEDDED WITHIN A TIRE

(75) Inventor: Paul B. Wilson, Murfreesboro, TN (US)

(73) Assignee: Bridgestone/Firestone Research, Inc., Akron, OH (US)

( * ) Notice: Under 35 U.S.C. 154(b), the term of this patent shall be extended for 0 days.

(21) Appl. No.: 09/302,069

(22) Filed: Apr. 29, 1999

(51) Int. Cl.[7] .............................. E01C 23/02; B60C 19/00
(52) U.S. Cl. ........................................ 73/146; 152/152.1
(58) Field of Search .................. 73/146, 146.5; 152/152.1; 156/123

(56) References Cited

U.S. PATENT DOCUMENTS

| | | | |
|---|---|---|---|
| 3,806,869 | 4/1974 | Davis, Jr. | 340/58 |
| 4,010,354 | 3/1977 | Apicella, Jr. et al. | 235/61.1 R |
| 4,067,235 | 1/1978 | Markland et al. | 73/146.5 |
| 4,137,520 | 1/1979 | Deveau | 340/58 |
| 4,160,234 | 7/1979 | Karbo et al. | 340/58 |
| 4,237,728 | 12/1980 | Betts et al. | 73/146.5 |
| 4,311,985 | 1/1982 | Gee et al. | 340/58 |
| 4,334,215 | 6/1982 | Frazier et al. | 340/539 |
| 4,494,106 | 1/1985 | Smith et al. | 340/58 |
| 4,570,152 | 2/1986 | Melton et al. | 340/58 |
| 4,578,992 | 4/1986 | Galasko et al. | 73/146.5 |
| 4,588,978 | 5/1986 | Allen | 340/58 |
| 4,609,905 | 9/1986 | Uzzo | 340/58 |
| 4,695,823 | 9/1987 | Vernon | 340/58 |
| 4,717,905 | 1/1988 | Morrison, Jr. et al. | 340/58 |
| 4,816,839 | 3/1989 | Landt | 343/795 |
| 4,845,649 | 7/1989 | Eckardt et al. | 364/571.02 |
| 4,862,486 | 8/1989 | Wing et al. | 377/16 |
| 4,911,217 | 3/1990 | Dunn et al. | 152/152.1 |
| 5,181,975 | 1/1993 | Pollack et al. | 152/152.1 |
| 5,218,861 | * 6/1993 | Brown et al. | 73/146.5 |
| 5,231,872 | 8/1993 | Bowler et al. | 73/146.5 |
| 5,235,850 | 8/1993 | Schurmann | 73/146.5 |
| 5,285,189 | 2/1994 | Nowicki et al. | 340/447 |
| 5,319,354 | 6/1994 | Myatt | 340/572 |
| 5,348,067 | 9/1994 | Myatt | 152/152.1 |
| 5,413,159 | 5/1995 | Olney et al. | 152/418 |
| 5,483,826 | 1/1996 | Schultz et al. | 73/146.5 |
| 5,483,827 | 1/1996 | Kulka et al. | 73/146.5 |
| 5,500,065 | 3/1996 | Koch et al. | 156/123 |
| 5,559,484 | 9/1996 | Nowicki et al. | 340/447 |
| 5,562,787 | 10/1996 | Koch et al. | 156/64 |
| 5,573,610 | * 11/1996 | Koch et al. | 152/152.1 |
| 5,573,611 | * 11/1996 | Koch et al. | 152/152.1 |
| 5,600,301 | 2/1997 | Robinson, III | 340/442 |
| 5,731,754 | 3/1998 | Lee, Jr. et al. | 340/447 |

\* cited by examiner

*Primary Examiner*—William Oen
*Assistant Examiner*—Abdullahi Aw-Musse
(74) *Attorney, Agent, or Firm*—Michael Sand; John M. Vasuta; David A. Thomas

(57) ABSTRACT

A method and apparatus for connecting an electronic monitoring device to a pneumatic tire includes the steps of providing a green tire and attaching the electronic monitoring package to an anchoring patch. The anchoring patch having the electronic monitoring package is then mounted to the green tire and cured during the green tire cure process. A battery is then provided and a direct electrical connection between the electronic monitoring package and battery is then formed by plugging the battery into the electronic monitoring package. The electronic monitoring package may also be mounted in the green tire itself and cured with the green tire. The battery is connected to the electronic monitoring package after the cure process.

51 Claims, 4 Drawing Sheets

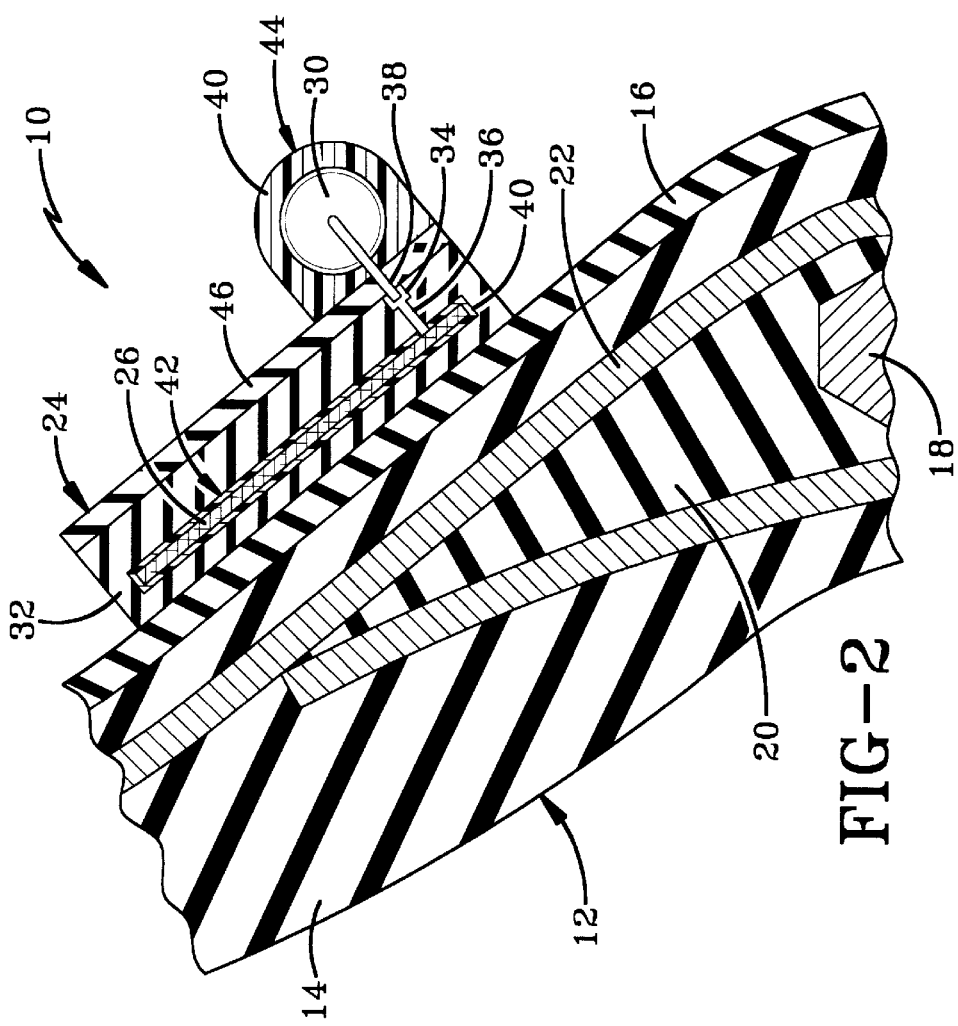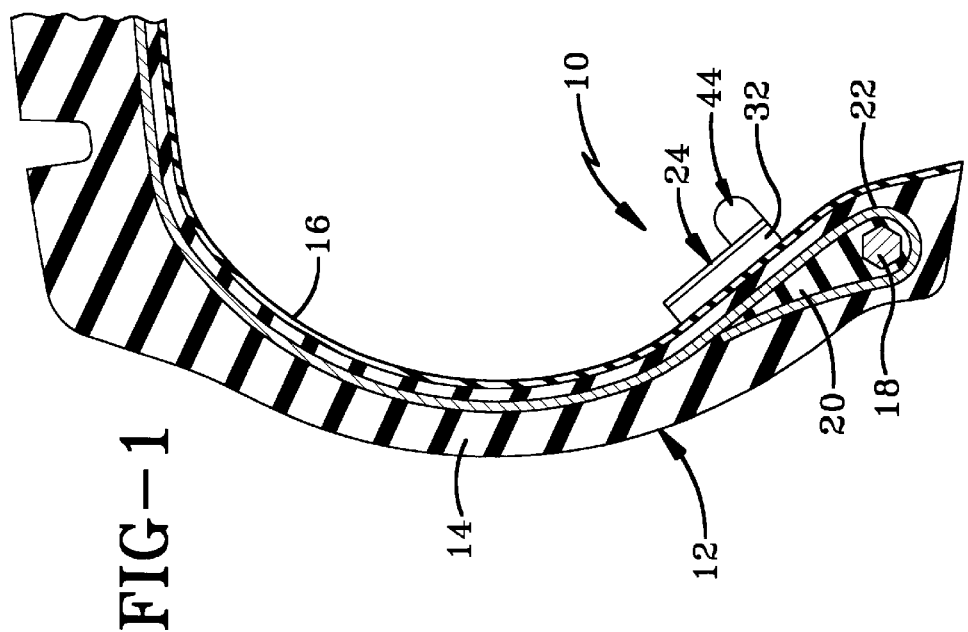

APPARATUS AND METHOD OF PROVIDING ELECTRICAL POWER TO AN ACTIVE ELECTRONIC DEVICE EMBEDDED WITHIN A TIRE

BACKGROUND OF THE INVENTION

1. Technical Field

This invention generally relates to monitoring devices that monitor engineering conditions of pneumatic tires and, more particularly, to an apparatus and method for connecting the power supply to an active, programmable electronic monitoring device mounted on the inside of a pneumatic tire. Specifically, the present invention relates to an apparatus and method for attaching a battery to the components of an active monitoring device after the components are cured into a patch that is attached to the innerliner of a pneumatic tire.

2. Background Information

It is often desired in the art to monitor various engineering conditions of a pneumatic tire. These measurements are preferably taken while the tire is in use on the vehicle without having to remove the tire from the vehicle or specifically position the tire to take the measurement. Numerous types of monitoring devices are known in the art to perform these measurements. One type of monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the data created by the monitoring device to a data gathering device positioned outside of the tire. One of the problems in the art is to position the antenna such that the data created by the monitoring device is accurately and reliably transmitted to the data gathering device outside of the tire. It is desired to position the antenna as close to the outside of the pneumatic tire as possible so that the transmissions pass through as little of the tire as possible. In the past, the antenna of the monitoring device generally extended into the interior chamber of the tire such that the radio waves had to first pass through the air inside the tire, through the innerliner, through the tire sidewall, and then through the air to the data gathering device. It is desired in the art to provide an antenna for an active, self-powered programmable electronic device that is positioned so that the radio waves do not have to first pass through the inner chamber of the tire before entering the tire sidewall. The bead ring and apex filler of the tire tend to interfere with the radio transmission from the monitoring device. It is thus desired in the art to position the antenna away from the bead ring and apex filler so that the transmission through the tire sidewall is as strong as possible. On the other hand, it is also desirable to position the monitoring device as close to the bead ring as possible because that area of the sidewall is a low flex area that stretches less than the middle portion of the tire sidewall. It is thus desired in the art to ideally locate the antenna and the monitoring device with respect to the tire sidewall.

The monitoring devices known in the art are typically encapsulated with an encapsulation material that provides structural support to the monitoring device so that the device is not destroyed by the forces normally encountered and experienced by a pneumatic tire. Another problem with these electronic monitoring devices is the problem of attaching the encapsulated monitoring device to the tire. The attachment problem is difficult because the forces on the electronic device are significant and numerous. The tires are not only subjected to rotational forces when the vehicle is moving but are also subjected to various impact forces when the tire contacts bumps or surface irregularities. The attachment of the monitoring device to the tire must be strong enough and secure enough to maintain the position of the monitoring device with respect to the tire while experiencing all of these forces while also protecting the monitoring device from damage resulting from these forces.

One method of anchoring the components of the monitoring device as well as the antenna of the monitoring device within a pneumatic tire is to cure these components and antenna within the body of the tire. For instance, the components of the monitoring device and the antenna may be cured within the innerliner of the tire. The components may also be cured within a patch that is then connected to the innerliner. A significant problem with curing these elements in the body of the tire or into a patch is that the battery used to supply power to the components of the monitoring device is damaged or destroyed by the heat of the curing process. The damage to the battery caused by the heat of the curing process has prevented electronic monitoring devices from being embedded within a green tire and then cured into the tire during the green tire cure process. The damage to the battery is especially unfortunate because positioning the antenna and monitoring device components within the innerliner or within a patch that is connected to the innerliner allows the components and antenna to be ideally positioned and secured for use with the tire. It is thus desired in the art to provide an apparatus and method for connecting the monitoring device to the tire by curing the components and antenna of the monitoring device within the tire or a patch that is connected to the tire and then subsequently connecting the battery to the components.

SUMMARY OF THE INVENTION

In view of the foregoing, it is an objective of the present invention to provide an apparatus and method of providing electrical power to an active electronic monitoring device embedded within the body of the tire or a patch connected to the tire.

Another objective of the present invention is to provide an apparatus for monitoring an engineering condition of a pneumatic tire where the monitoring components and antenna of an active monitoring device are cured within a first patch that is cured to the innerliner of a tire and where the battery is connected to a second patch that is subsequently connected to the first patch carrying the monitoring device components.

Another objective of the present invention is to provide a monitoring device that allows the battery to be selectively connected to the electronic monitoring package so that different batteries may be used and so that the batteries may be replaced after a battery wears out.

Another objective of the present invention is to provide a monitoring device that allows the antenna to be positioned in a manner that causes the transmission signal to pass directly into the tire sidewall away from the bead ring and apex filler of the tire.

Another objective of the present invention is to provide an electronic monitoring package having a connector that allows the connection between the battery and the monitoring package to be selectively formed after the monitoring package has been connected to the innerliner of the tire.

Another objective of the present invention is to provide a monitoring device for a pneumatic tire where the electronic monitoring package of the monitoring device is provided with a plug or a receptacle and the battery that powers the electronic monitoring package is provided within the corresponding receptacle or plug so that the connection between the battery and electronic monitoring package may be made after the electronic monitoring package has been cured within a patch or the innerliner of the tire.

Another objective of the present invention is to provide a method of connecting a monitoring device to a pneumatic tire wherein the electronic monitoring package of the monitoring device is first cured within the innerliner, or a patch that is cured to the innerliner of a tire, and the battery that powers the electronic monitoring package is subsequently connected to the monitoring package.

Another objective of the present invention is to provide a method and apparatus that are of simple construction, that achieve the stated objectives in a simple, effective, and inexpensive manner, that solve the problems, and that satisfy the needs existing in the art.

These and other objectives and advantages of the present invention are obtained by a method of connecting an electronic monitoring device to a pneumatic tire including the steps of providing a green tire having an innerliner; providing an anchoring patch and an electronic monitoring package; attaching the electronic monitoring package to the anchoring patch; mounting the anchoring patch having the electronic monitoring package on the innerliner of the green tire; curing the green tire and the anchoring patch; providing a battery; and forming a direct electrical connection between the electronic monitoring package and the battery after the green tire is cured.

Other objectives and advantages of the invention are obtained by a method of connecting an electronic monitoring device to a pneumatic tire including the steps of providing a green tire having an innerliner with an electronic monitoring package connected to the innerliner; curing the green tire; providing a battery; and forming a direct electrical connection between the electronic monitoring package and the battery after the green tire is cured.

Further objectives and advantages of the invention are obtained by a monitoring device and pneumatic tire in combination, the combination including a pneumatic tire having an innerliner; an anchoring layer mounted on the innerliner; an electronic monitoring package connected to the anchoring layer; and a battery selectively electrically connected to the electronic monitoring package.

Still other objectives and advantages of the invention are achieved by a monitoring device and pneumatic tire in combination, the combination including a pneumatic tire having an innerliner; an electronic monitoring package connected to the innerliner; and a battery selectively electrically connected to the electronic monitoring package.

BRIEF DESCRIPTION OF THE DRAWINGS

Preferred embodiments of the invention, illustrative of the best mode in which applicant has contemplated applying the principles of the invention, are set forth in the following description and are shown in the drawings and are particularly and distinctly pointed out and set forth in the appended claims.

FIG. 1 is a sectional view of a pneumatic tire with an electronic monitoring device mounted on the innerliner of the tire;

FIG. 2 is an enlarged sectional view of the electronic monitoring device and a portion of the pneumatic tire;

Similar numerals refer to similar parts throughout the drawings.

DESCRIPTION OF THE PREFERRED EMBODIMENTS

Figure 3:
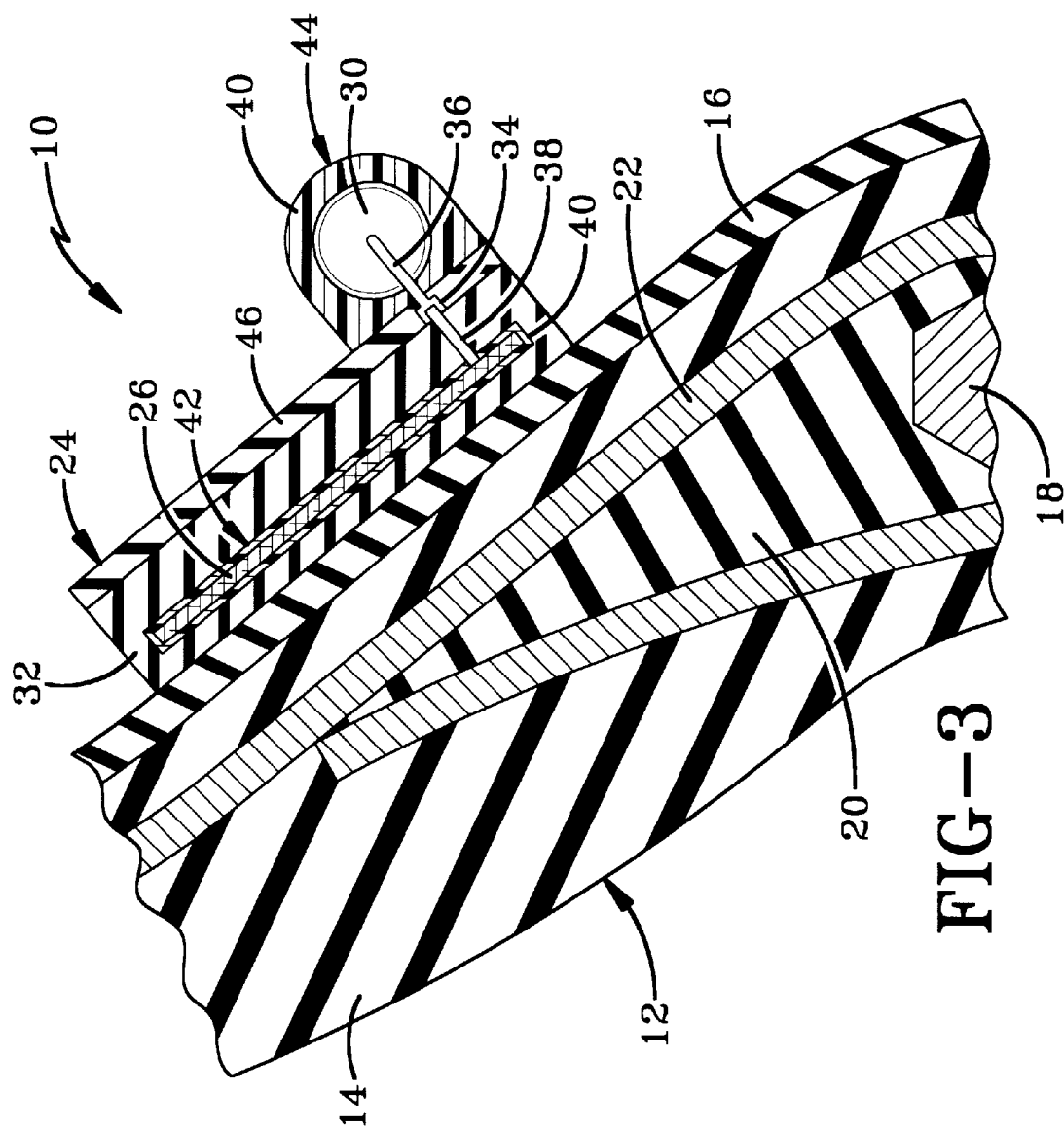
FIG. 3 is a view similar to FIG. 2 showing an alternate configuration of the monitoring device.

The first embodiment of the monitoring device and pneumatic tire combination of the present invention is depicted in FIGS. 1–3 and is indicated generally by the numeral 10. Combination 10 includes a pneumatic tire 12 that has a sidewall 14 and an innerliner 16. Sidewall 14 includes a bead ring 18, an apex filler 20, and a reinforcing cord package 22. A monitoring device 24 having an electronic monitoring package 26 is attached to innerliner 16 in a position where the antenna of electronic monitoring package 26 is positioned away from bead ring 18 and apex filler 20 while monitoring device 24 is positioned close to bead ring 18 in the low flex area of sidewall 14. Monitoring device 24 is disposed in the pressurized chamber of tire 12 when tire 12 is in use.

Electronic monitoring package 26 may include a variety of components that are known in the art to monitor at least one engineering condition of pneumatic tire 12 and transmit information about the condition through tire sidewall 14 to a data gathering device (not shown) positioned outside the tire. Electronic monitoring package 26 includes at least one sensing element that monitors or measures an engineering condition of a tire and transmits the gathered data through an antenna. Monitoring device 24 is attached to innerliner 16 by any of the variety of methods that are known in the art. For instance, monitoring device 24 may be attached to innerliner 16 with a suitable adhesive. In another embodiment described in more detail below, monitoring device 24 is attached to innerliner 16 through a curing process.

In accordance with one of the objectives of the present invention, monitoring device 24 is constructed to allow a power source such as a battery 30 that supplies power to electronic monitoring package 26 to be selectively electrically connected after electronic monitoring package 26 is cured within innerliner 16 or a patch. the invention also allows electronic monitoring package 26 to be connected to tire 12 by any method with battery 30 connected at a later time. In the first embodiment of the present invention, electronic monitoring package 26 is embedded within an anchoring layer 32 which is connected to innerliner 16. A socket 34 is electrically connected to electronic monitoring package 26 by a suitable connector 36. Socket 34 is disposed adjacent the outer surface of anchoring layer 32 so that a plug 38 electrically connected to battery 30 may selectively connect with socket 34 to provide direct electrical connection between battery 30 and electronic monitoring package 26. A pair of plug 38 and socket 34 combinations may be provided for both poles of battery 30 if desired. The connection between plug 38 and socket 36 is made when battery 30 is connected to anchoring layer 32 as will be described in more detail below.

In the first embodiment of the invention, electronic monitoring package 26 is encapsulated by an encapsulation material 40 to create an encapsulated monitoring package 42. Encapsulation material 40 provides a rigid protective shell about the components of electronic monitoring package 26 that prevents them from being damaged when subjected to the numerous forces that package 26 will likely encounter during its life. Encapsulated monitoring package 42 is embedded within anchoring layer 32 that is a layer of cured rubber. Encapsulated monitoring package 42 may also be directly connected to tire 12. Battery 30 is also encapsulated with an encapsulation material 40 to provide an encapsulated battery 44. Encapsulated battery 44 may be mounted on an attachment patch 46 that may be fabricated from a variety of rubbers that have the ability to be adhered to anchoring layer 32. Plug 38 extends through attachment patch 46 so that it may be securely fit into socket 36 when attachment patch 46 and encapsulated battery 44 are mounted on anchoring layer 32.

An alternative configuration of monitoring device 24 is depicted in FIG. 3. The components of this configuration are substantially the same as monitoring device 24 described above with the exception that plug 38, connector 36, and socket 34 are reversed such that plug 38 extends from anchoring layer 32 with socket 34 being carried in attachment patch 46.

Figure 4:
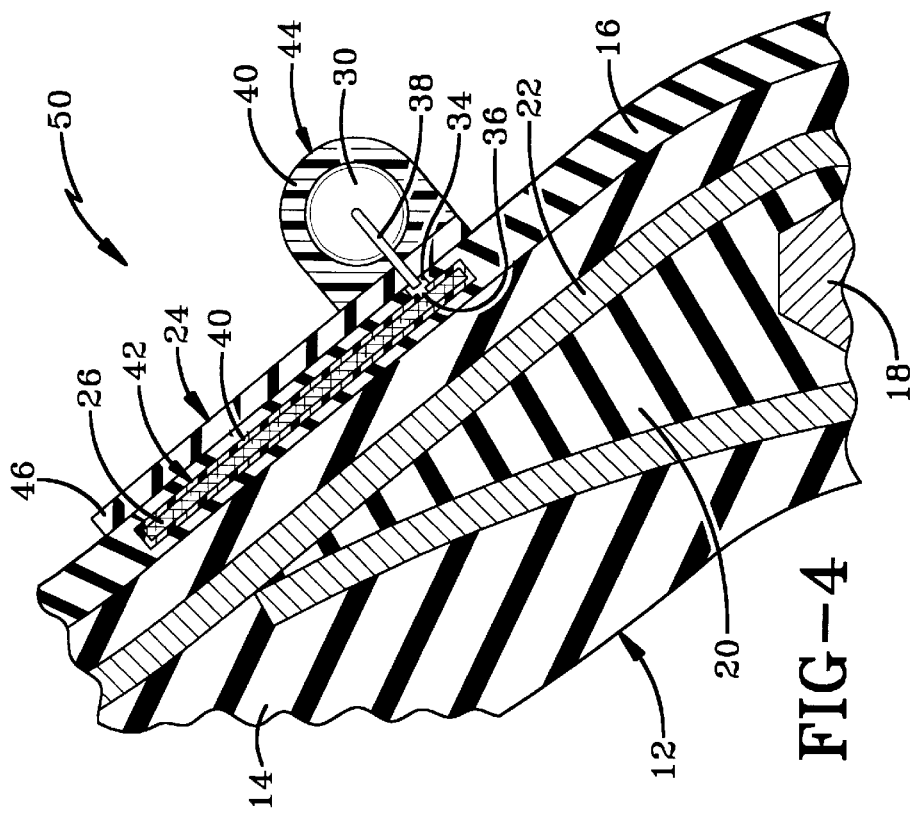
FIG. 4 is a view similar to FIG. 2 showing an alternate embodiment of an electronic monitoring device and tire combination.

An alternative embodiment of an electronic monitoring device and tire combination is depicted in FIG. 4 and is indicated generally by the numeral 50. The components of combination 50 are similar to the components described above and the same numbers are used to indicate the same parts. In combination 50, encapsulated monitoring package 42 is cured within innerliner 16 during the cure process of tire 12. This allows the antenna and components of monitoring package 26 to be ideally positioned within sidewall 14.

After the green tire is cured to form tire 12, encapsulated battery 44 is directly electrically connected to electronic monitoring package 26 by connecting plug 38 with socket 34 as depicted in FIG. 4. Encapsulated battery 44 may be mounted on an attachment patch 46 that allows encapsulated battery 44 to be mounted on innerliner 16.

Figure 5:
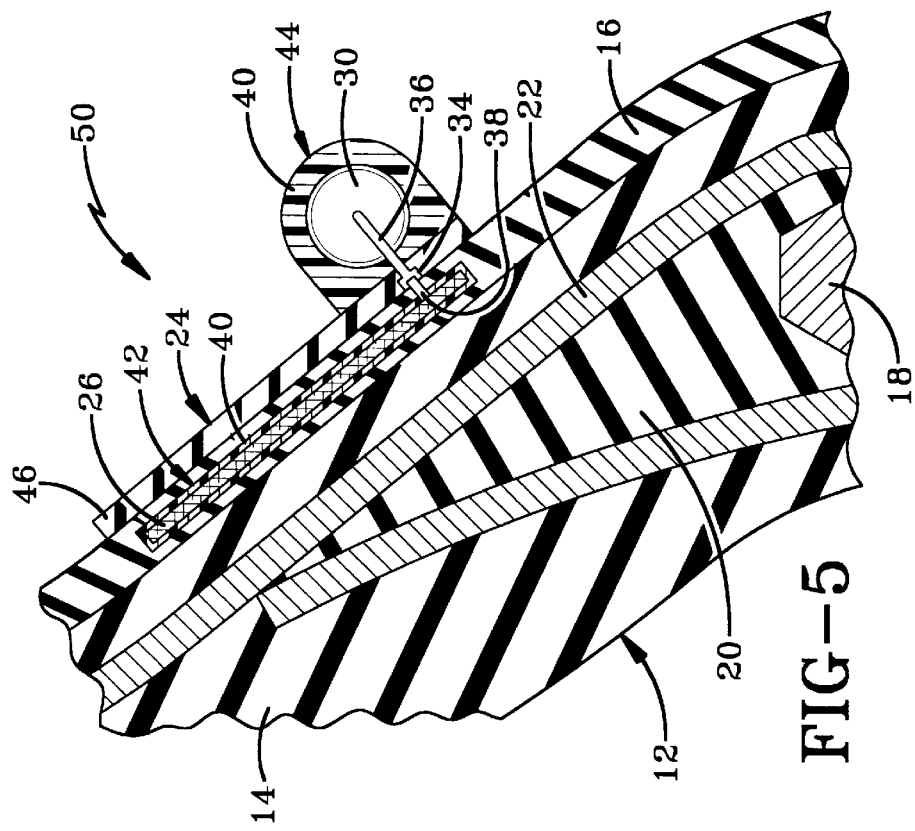
FIG. 5 is a view similar to FIG. 4 showing an alternate configuration of the combination of FIG. 4.

An alternative configuration of combination 50 is depicted in FIG. 5 with the only difference being that components 34, 36 and 38 are reversed such that plug 38 extends out of innerliner 16 and socket 34 is carried by attachment patch 46.

Figure 7:
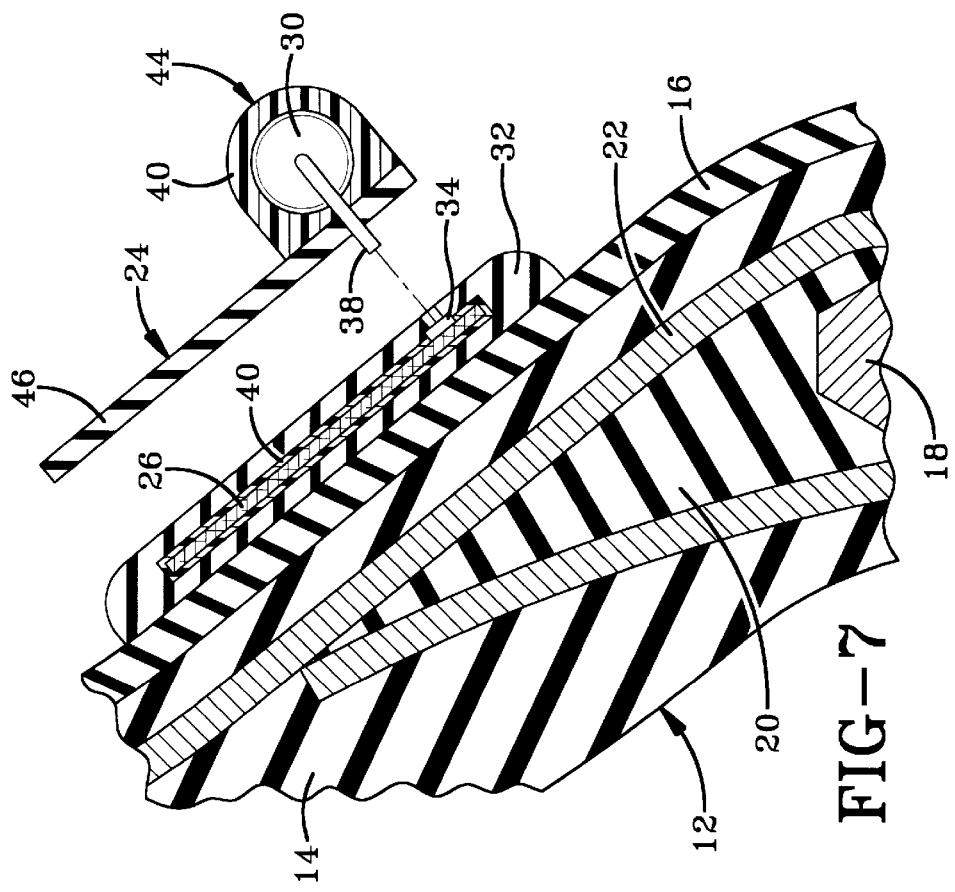
FIG. 7 is a view of the tire of FIG. 6 after the green tire has been cured and the cover of the anchoring patch has been removed.
Figure 6:
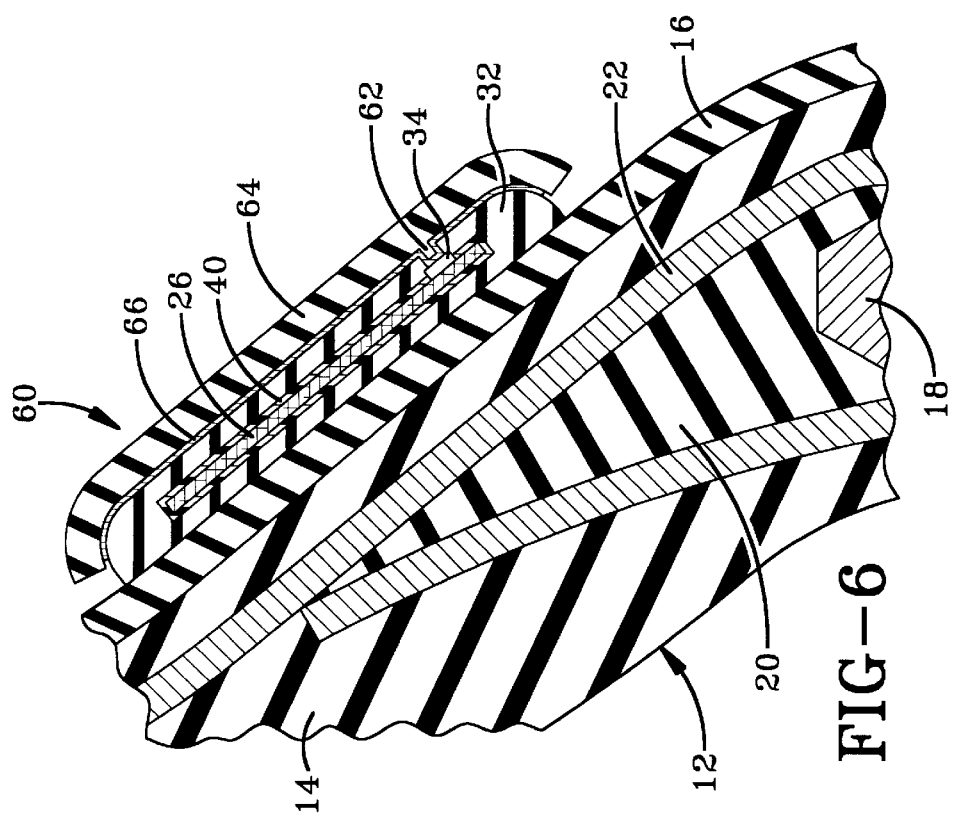
FIG. 6 is a view of a green tire with an anchoring patch mounted on the innerliner of the green tire.

The apparatus and method of using anchoring layer 32 is disclosed and described in U.S. patent applications Ser. Nos. 09/205,931 and 09/206,273, filed Dec. 4, 1998 which are owned by the assignee of the present application. The method of using an anchoring patch 60 having anchoring layer 32 that carries electronic monitoring package 26 is depicted in FIGS. 6 and 7. Electronic monitoring package 26 is first encapsulated with encapsulation material 40 by methods known in the art. During the encapsulation process, the position of socket 34 is noted so that plug 38 may later form the connection between battery 30 and monitoring package 26. The position of socket 34 may be noted by providing a temporary plug 62 in the cover 64 of anchoring patch 60. A layer of cure material 66 (such as cure paper or cure cloth) is disposed between cover 64 and anchoring layer 32 to prevent cover 64 from curing to anchoring layer 32. Anchoring patch 60 having electronic monitoring package 26 is then connected to innerliner 16 of a green tire before the green tire cure process. Patch 60 may be aggressively stitched to innerliner 16 to provide a secure connection between the two elements.

The green tire is then cured by a known green tire curing process to form tire 12. The cure process cures the uncured rubber of anchoring layer 32 of anchoring patch 60. In accordance with one of the objectives of the present invention, the green tire cure process thus cures electronic monitoring package 26 in anchoring layer 32. The curing process also cures anchoring layer 32 to innerliner 16 such that anchoring layer 32 is securely connected to tire 12. Cover 64 and layer 66 are then removed to expose socket 34. Encapsulated battery 44 is then mounted on attachment patch 46 with plug 38 protruding through attachment patch 46. A suitable adhesive is then used to connect attachment patch 46 to anchoring layer 32 with plug 38 snugly received in socket 34 to form a direct electrical connection between battery 30 and electronic monitoring package 26. This method allows electronic monitoring package 26 to be cured within anchoring layer 32 without subjecting battery 30 to the heat of the cure process.

Another advantage with the configuration of this invention is that battery 30 may be relatively easily removed and replaced when it loses power. Battery 30 may be replaced because the connection between battery 30 and electronic monitoring package 26 is a selective connection that may be broken at a later date by removing battery 30 and plug 38 and replacing them with a new battery. The configuration also allows batteries to be connected to package 26 that have different sizes or powers.

Accordingly, the improved apparatus and method of providing electrical power to an active electronic device embedded within a tire is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved apparatus and method of providing electrical power to an active electronic device embedded within a tire is construed and used, the characteristics of the construction, and the advantageous, new and useful results obtained; the new and useful structures, devices, elements, arrangements, parts and combinations, are set forth in the appended claims.

What is claimed is:

1. A method of connecting an electronic monitoring device to a pneumatic tire and providing power to the monitoring device, the method comprising the steps of:

(a) providing a green tire having an innerliner;

(b) providing an anchoring patch and an electronic monitoring package;

(c) attaching the electronic monitoring package to the anchoring patch;

(d) mounting the anchoring patch having the electronic monitoring package on the innerliner of the green tire;

(e) curing the green tire and the anchoring patch;

(f) providing a battery that is not connected to the electronic monitoring package; and (g) forming a direct electrical connection between the electronic monitoring package and the battery after the green tire is cured.

2. The method of claim 1, further comprising the step of encapsulating the electronic monitoring packaging with an encapsulation material to form an encapsulated electronic monitoring package.

3. The method of claim 2, wherein step (c) includes the step of embedding the encapsulated electronic monitoring package within the anchoring patch.

4. The method of claim 3, wherein step (b) includes the step of providing an anchoring patch having an anchoring layer and a cover.

5. The method of claim 4, wherein the step of embedding the encapsulated electronic monitoring package includes the step of embedding the electronic monitoring package in the anchoring layer.

6. The method of claim 4, further comprising the step of removing the cover of the anchoring patch after the step (e) has been performed.

7. The method of claim 1, further comprising the steps of providing an attachment patch and mounting the battery on the attachment patch prior to performing step (g).

8. The method of claim 7, further comprising the step of connecting the attachment patch the anchoring patch.

9. The method of claim 7, further comprising the step of encapsulating the battery in an encapsulation material prior to the step of mounting the battery on the attachment patch.

10. The method of claim 1, wherein step (b) includes the step of providing a first connection element electrically connected to the electronic monitoring package and wherein step (f) includes the step of providing a second connection element electrically connected to the battery.

11. The method of claim 10, wherein step (g) includes the step of connecting the first connection element with the second connection element.

12. A method of connecting an electronic monitoring device to a pneumatic tire and providing power to the monitoring device, the method comprising the steps of:

(a) providing a green tire having an innerliner with an electronic monitoring package connected to the innerliner;

(b) curing the green tire;

(c) providing a battery that is not connected to the electronic monitoring package; and (d) forming a direct electrical connection between the electronic monitoring package and the battery after the green tire is cured.

13. The method of claim 12, wherein step (c) includes the step of encapsulating the battery with an encapsulation material.

14. The method of claim 13, further comprising the steps of providing an attachment patch, mounting the battery on the attachment patch, and mounting the attachment patch on the innerliner.

15. The method of claim 12, wherein step (a) includes the step of providing a first connection element electrically connected to the electronic monitoring packaging and wherein step (c) includes the step of providing a second connection element electrically connected to the battery.

16. The method of claim 15, wherein step (d) includes the step of connecting the first connection element with the second connection element.

17. The method of claim 12, wherein step (a) includes the step of embedding the monitoring package within the innerliner.

18. A monitoring device having a selectively removable power source and pneumatic tire in combination, the combination comprising:

a pneumatic tire having an innerliner;

an anchoring layer mounted on the innerliner;

an electronic monitoring package connected to the anchoring layer; and a battery disposed outside the anchoring layer and selectively electrically connected to the electronic monitoring package whereby the electronic monitoring package may be selectively powered after the electronic monitoring package is connected to the anchoring layer.

19. The combination of claim 18, wherein the battery is mounted on the anchoring layer.

20. The combination of claim 19, further comprising an attachment patch mounted on the anchoring layer; the battery mounted on the attachment patch.

21. The combination of claim 20, wherein the battery is encapsulated with an encapsulation material.

22. The combination of claim 18, wherein the anchoring layer is cured to innerliner.

23. The combination of claim 18, further comprising a first connection element connected to the electronic monitoring package and a second connection element connected to the battery; the first connection element selectively connected to the second connection element.

24. The combination of claim 23, wherein the first connection element is a receptacle and the second connection element is a plug that at least partially fits within the receptacle.

25. The combination of claim 23, wherein the first connection element is a plug and the second connection element is a receptacle; the plug at least partially fitting within the receptacle.

26. The combination of claim 18, wherein the electronic monitoring package is embedded within the anchoring layer.

27. The combination of claim 26, wherein the electronic monitoring package is cured within the anchoring layer.

28. A monitoring device having a selectively removable power source and pneumatic tire in combination, the combination comprising:

a pneumatic tire having a body, the body including an innerliner;

an electronic monitoring package embedded within the body; and a battery selectively electrically connected to the electronic monitoring package; the battery disposed outside the body.

29. The combination of claim 28, further comprising a first connection element connected to the electronic monitoring package and a second connection element connected to the battery; the first connection element selectively connected to the second connection element.

30. The combination of claim 29, wherein the first connection element is a receptacle and the second connection element is a plug that at least partially fits within the receptacle.

31. The combination of claim 29, wherein the first connection element is a plug and the second connection element is a receptacle; the plug at least partially fitting within the receptacle.

32. The combination of claim 28, wherein the electronic monitoring package is embedded within the innerliner.

33. The combination of claim 32, wherein the electronic monitoring package is cured within the innerliner.

34. The combination of claim 28, further comprising an attachment patch mounted on the innerliner; the battery being carried by the attachment patch.

35. The combination of claim 34, wherein the battery is encapsulated with an encapsulation material.

36. A method of providing power to a monitoring device, the method comprising the steps of:
   (a) providing an electronic monitoring package;
   (b) providing a battery connected to a patch; and
   (c) forming a selective direct electrical connection between the electronic monitoring package and the battery after the battery has been connected to the patch.

37. The method of claim 36, further comprising the steps of providing a patch and connecting the electronic monitoring package to the patch.

38. The method of claim 37, wherein the step of connecting the electronic monitoring package to the patch includes the step of embedding the electronic monitoring package within the patch.

39. The method of claim 38, further comprising the step of curing the patch while the electronic monitoring package is embedded within the patch.

40. The method of claim 37, wherein the step (a) includes the step of providing a first connection element electrically connected to the electronic monitoring packaging and wherein step (b) includes the step of providing a second connection element electrically connected to the battery.

41. The method of claim 40, wherein the step of connecting the electronic monitoring package to the patch includes the step of connecting the first connection element with the second connection element.

42. The method of claim 36, further comprising the step of encapsulating the electronic monitoring package with an encapsulation material prior to step (c).

43. In combination:
   an electronic monitoring package;
   a battery selectively electrically connected to the electronic monitoring package; and
   an attachment patch, the battery mounted on the attachment patch.

44. The combination of claim 43, in further combination with a patch, the electronic monitoring package connected to the patch.

45. The combination of claim 44, wherein the attachment patch is mounted on the patch.

46. The combination of claim 45, wherein the battery is encapsulated with an encapsulation material.

47. The combination of claim 43, further comprising a first connection element connected to the electronic monitoring package and a second connection element connected to the battery; the first connection element selectively connected to the second connection element.

48. The combination of claim 47, wherein the first connection element is a receptacle and the second connection element is a plug that at least partially fits within the receptacle.

49. The combination of claim 47, wherein the first connection element is a plug and the second connection element is a receptacle; the plug at least partially fitting within the receptacle.

50. The combination of claim 44, wherein the electronic monitoring package is embedded within the patch.

51. The combination of claim 50, wherein the electronic monitoring package is cured within the patch.

* * * * *